(12) United States Patent
Gelbart et al.

(10) Patent No.: US 7,970,776 B1
(45) Date of Patent: Jun. 28, 2011

(54) APPARATUS, METHOD AND COMPUTER READABLE MEDIUM FOR IDENTIFYING AND QUANTIFYING DATABASE DISK-SORT OPERATIONS

(75) Inventors: Sigal Gelbart, Hod Hasharon (IL); Meyron Ragulsky, Nes Ziona (IL); Liad Hacmon, Or Yehuda (IL); Ehud Eshet, Modiin (IL); Yochai Uliel, Jerusalem (IL)

(73) Assignee: Precise Software Solutions Inc., Redwood Shores, CA (US)

( * ) Notice: Subject to any disclaimer, the term of this patent is extended or adjusted under 35 U.S.C. 154(b) by 398 days.

(21) Appl. No.: 12/187,446

(22) Filed: Aug. 7, 2008

Related U.S. Application Data (60) Provisional application No. 61/086,792, filed on Aug. 6, 2008.

(51) Int. Cl.
*G06F 17/30* (2006.01)
*G06F 7/00* (2006.01)

(52) U.S. Cl. ......... 707/752; 707/719; 707/725; 707/769
(58) Field of Classification Search .................. None
See application file for complete search history.

(56) References Cited

U.S. PATENT DOCUMENTS

| | | | |
|---|---|---|---|
| 6,816,874 B1* | 11/2004 | Cotner et al. | 707/769 |
| 7,668,171 B2* | 2/2010 | Bondarenko et al. | 370/395.1 |
| 7,673,291 B2* | 3/2010 | Dias et al. | 717/127 |
| 2003/0110153 A1* | 6/2003 | Shee | 707/1 |
| 2005/0065921 A1* | 3/2005 | Hrle et al. | 707/3 |
| 2009/0327854 A1* | 12/2009 | Chhajer et al. | 715/227 |

* cited by examiner

*Primary Examiner* — Greta L Robinson
*Assistant Examiner* — James J Wilcox
(74) *Attorney, Agent, or Firm* — Mark M. Friedman (57) ABSTRACT

Apparatus, methods, and computer code for monitoring a database and for determining estimated aggregate disk-sort wait times for a database statement and/or database table and/or database index and/or database session are described. A description of database performance may be presented to a user in accordance with the determined aggregate disk-sort wait time(s).

20 Claims, 7 Drawing Sheets

| Elements: Entries Sorted by in Oracle (Summed) | | |
|---|---|---|
| Statement | In Oracle (Summed) | % |
| 17266.07348.00417.36397 | | 59.99% |
| 44195.14172.21735.48666 | | 34.04% |
| 27436.04039.18217.47340 | | 4.25% |
| 10253.50784.39747.33117 | | 1.70% |
| | | |

APPARATUS, METHOD AND COMPUTER READABLE MEDIUM FOR IDENTIFYING AND QUANTIFYING DATABASE DISK-SORT OPERATIONS

This patent application claims the benefit of U.S. Provisional Patent Application No. 61/086,792 filed Aug. 6, 2008 by the present inventors

BACKGROUND OF THE INVENTION

1. Field of the Invention

The present invention relates to methods, apparatus and computer-code for database administration.

2. Related Art

It is known that various operations and SQL statement executions can create sort activity in the database. Below is a list of common SQL commands/clauses that may trigger a sort operation:

CREATE INDEX, ALTER INDEX . . . REBUILD
DISTINCT
ORDER BY
GROUP BY
UNION
INTERSECT
MINUS
Certain joins
Certain subqueries In order to carry out the sort operation, memory and processing power are required. Many relational databases operate as follows: (i) in the event that enough volatile memory is "available" to carry out the sort of the retrieved data, the sort is carried out in volatile memory; (ii) otherwise, the sort is carried out when the data to be sorted resides, at least in part, in volatile memory. For at least some relational databases, the amount of volatile memory that may be used for sorting operations may be defined by one or more "configuration parameters" that is controllable by the database administrator (DBA).

In the event that the value of this parameter is "too low," then it is possible that too many 'disk-sort' operations may be carried out. On the other hand, if the value of this parameter is set "too high," then this may require deploying additional physical memory and/or this may cause a situation where the amount of RAM available for other purposes may be limited.

For the particular case of Oracle®, the area of RAM in which data may be sorted is known as the system global area (SGA). For some versions of Oracle®, PGA_AGGREGATE_TARGET and/or one or more other parameters may be used by a database administrator (DBA) to control the amount of RAM available for sort operation(s) required by database statement(s). For Oracle® or any other relational database, the disk sort operations may be carried out when the data is in a "temporary file."

Unfortunately, there are situations where effecting sorts on disk (i.e. as opposed to in RAM) when executing database statements may significantly slow the speed of execution of one or more database statement(s), and may negatively impact database performance.

There is an ongoing need for tools and techniques for detecting when and to what is data, and for providing appropriate 'tuning' guidance to database administrators in order to properly configure the database (i.e. by increasing the amount of RAM available for sorting data and/or by re-writing one or more database statements to reduce the need for disk-sort and/or by upgrading a disk on which data is sorted and/or in any other manner) to improve database performance.

SUMMARY OF EMBODIMENTS

Embodiments of the present invention relate to performance-monitoring, during a particular time period, of "sort-on-disk-triggering" database statements. Each such 'sort-on-disk-triggering' database statement: (i) may be executed multiple times during the particular time period; and (ii) may thus cause multiple distinct "sort-on-disk" events during the particular time period.

By monitoring disk-sort operations of a relational database (i.e. during runtime of that database) on a 'per-statement basis' during a particular time period, it is possible to determine a respective aggregate "sort-on-disk" time (i.e. the sum total of the disk-sorts wait times for a given database statement which may carry out multiple sorts on disk) for each sort-on-disk-triggering database statement. This information about the aggregate disk-sort wait time is useful when presenting a description of database performance to a user (for example, a DBA).

According to one non-limiting use case, a total or aggregate wait time associated with "disk-sort" operations of a given "target" database statement during the time interval is quantified, and an indication of the relative contribution of "disk-sort" operations to the total wait time may be displayed to the user.

In one example, this total time may be expressed in absolute time units (i.e. seconds or minutes, etc). Alternatively or additionally, a ratio between (i) a total wait time attributable to on-disk sorts caused by execution of a given database statement (or group of statements); and (ii) a total wait time of the same database statement (or group of statements) (i.e., during the 'given time interval') may be presented.

In one particular example, this ratio (or any other wait time ratio involving aggregate disk sort time) may be presented only if the ratio exceeds a certain "threshold"—i.e. only in situations where the sort-on-disk time "significantly" impacts database performance of the database statement.

In another example, a description of the relative contribution of "disk sort" wait time to total wait time is presented in the same interface that describes relative contribution of "other types" of wait time—for example, internal lock wait and/or OS wait and/or communication wait and/or any other type of wait.

In another use case, the total amount of wait time due to disk sorts (or alternatively the relative contribution, to total wait time, of wait time due to disk sorts) may be measured, for a given database statement, for: (i) a first time period; and (ii) a later time period. The presentation about disk-sort wait time for the given "triggering" database statement may be conditional on an increase (i.e. any increase or an increase beyond some sort of threshold) in the total disk-sort wait time (or the relative contribution of disk-sort wait time to total wait time for the given database statement) from the first time period to the later time period. Thus, in the event that the disk-sort wait time is "trending up," over time, some sort of alert may be presented to the user.

It is now disclosed for the first time a method for displaying information related to performance of a database during a time interval where a given database statement is involved in multiple disk-sort operations, the method comprising: a) determining an estimated aggregate disk-sort wait time for the given database statement for the time interval when: i) the given database statement is involved in multiple disk-sort operations which contribute to the aggregate disk-sort wait time; and ii) the aggregate disk-sort wait time for the given database statement is only a fraction of a total disk-sort wait time for the database during for the time interval; and b) in accordance with the estimated aggregate disk-sort wait time for the given database statement, presenting, to a user, a description of performance of the database during the time interval.

According to some embodiments, the estimated aggregate disk-sort wait time for the given database statement is an aggregated wait time for a proper sub-set of all database disk-sort operations carried out by execution of the given database statement during the time interval.

According to some embodiments, i) the given database statement is invoked in a plurality of distinct associated sessions during the time interval; and ii) the proper sub-set is determined in accordance with session identifier.

According to some embodiments, the determining of the estimated aggregate disk-sort wait time for the given database statement for the time period includes: i) for each distinct sample time of a plurality of sample times during the time interval: A) respectively detecting a disk-sort operation; B) effecting a respective one or more correlation operations to correlate respective results of the detecting with an identifier of the given database statement; and ii) determining the aggregate disk-sort wait time for the given database statement in accordance with results the assessings and the correlatings for the plurality of sample times.

According to some embodiments, i) the respective effecting of one or more correlation operations further includes correlating the respective results of the detecting with an identifier or an invoking database session which invoked the target database statement; and ii) the determining of the aggregate disk-sort wait time is carried out on a per-session basis in accordance with results of the correlating with the database session identifier.

According to some embodiments, the presented performance description describes the aggregate disk-sort wait time for the target database statement during the time interval. Thus, in one non-limiting example, information may be presented to the DBA indicating that a "total disk-sort" wait time for a target database statement was X seconds or minutes.

According to some embodiments, the presented performance description describes a ratio between: i) the aggregate disk-sort wait time for the target database statement during the time interval; and ii) a total wait time for the target database statement during the time interval. Thus, in one non-limiting example, information may be presented to the DBA indicating that Y % of the total wait time for the target database statement is attributable to "total disk-sort" wait time.

In some embodiments, a list of database statements (or a sub-plurality thereof) is presented according to respective relative disk-sort wait times.

According to some embodiments, i) step (a) is carried out for a plurality of distinct database statements; and ii) the database performance description presenting include displaying a list of at least some of the database statements of the plurality of database statements in accordance with the respective estimated aggregate disk-sort wait times for each database statement of the plurality of database statements.

According to some embodiments, the displayed list of database statements is sorted in accordance with relative values of the estimated aggregate disk-sort wait times.

According to some embodiments, the database statement list displaying includes: i) selecting a sub-plurality of database statements from the plurality of distinct database statements in accordance with the relative estimated aggregate disk-sort wait times; ii) presenting only the selected sub-plurality of database statements. Thus, in one non-limiting example, disk-sort wait times are determined for some 'large number' of database statements, and only some of these are presented to the user (e.g. the DBA) as "tuning candidate"—for example, statements with relatively "large" disk-sort wait times or where disk-sort wait times is a relatively "large contributor" to total wait time. Thus, in this example, only the relatively "problematic statements" are pushed to the user interface.

According to some embodiments, the performance-data presenting includes presenting a description of a relation between the estimated aggregate disk-sort wait time for the target database statement and at least one of i) an aggregate lock wait-time during the time interval for the target database statement; ii) a total CPU wait time during the time interval for the target database statement; iii) a total communication wait time during the time interval for the target database statement; and iv) a total I/O wait time during the time interval for the target database statement.

It is now disclosed for the first time a method for displaying information related to performance of a database during a time interval where a given database index or table is involved in multiple disk-sort operations, the method comprising: a) determining an estimated aggregate disk-sort wait time for the given database index or table for the time interval when: i) the given database table or index is involved in multiple disk-sort operations which contribute to the aggregate disk-sort wait time; and ii) the aggregate disk-sort wait time for the given database table or index is only a fraction of a total disk-sort wait time for the database during for the time interval; and b) in accordance with the estimated aggregate disk-sort wait time for the given database table or index, presenting, to a user, data describing performance of the database during the time interval, According to some embodiments, the determining of the estimated aggregate disk-sort wait time for the given database statement for the time period includes: i) for each distinct sample time of a plurality of sample times during the time interval: A) respectively detecting a disk-sort operation; B) determining an identifier of a database statement involved in the disk-sort operation; C) correlating the disk-sort operation with the involved database and with a table or index accessed by the database statement; ii) determining the aggregate disk-sort wait time for the given database table or index in accordance with results the assessings and the correlatings for the plurality of sample times.

It is now disclosed for the first time a system for displaying information related to performance of a database during a time interval where a given database statement is involved in multiple disk-sort operations, the system comprising: a) a performance-data handler operative to determine an estimated aggregate disk-sort wait time for the given database statement for the time interval when: i) the given database statement is involved in multiple disk-sort operations which contribute to the aggregate disk-sort wait time; and ii) the aggregate disk-sort wait time for the given database statement is only a fraction of a total disk-sort wait time for the database during for the time interval; and b) performance-data presentation interface operative to present, to a user, a description of performance of the database during the time interval in accordance with the estimated aggregate disk-sort wait time for the given database statement.

According to some embodiments, the performance-data handler is operative such that the estimated aggregate disk-sort wait time for the given database statement is an aggregated wait time for a proper sub-set of all database disk-sort operations carried out by execution of the given database statement during the time interval.

According to some embodiments, i) the given database statement is invoked in a plurality of distinct associated sessions during the time interval; and ii) the performance-data handler is operative such that the proper sub-set is determined in accordance with session identifier.

According to some embodiments, the performance-data handler is operative such that the determining of the estimated aggregate disk-sort wait time for the given database statement for the time period includes: i) for each distinct sample time of a plurality of sample times during the time interval: A) respectively detecting a disk-sort operation; B) effecting a respective one or more correlation operations to correlate respective results of the detecting with an identifier of the given database statement; and ii) determining the aggregate disk-sort wait time for the given database statement in accordance with results the assessings and the correlatings for the plurality of sample times.

According to some embodiments, i) the respective effecting of one or more correlation operations further includes correlating the respective results of the detecting with an identifier or an invoking database session which invoked the target database statement; and ii) the determining of the aggregate disk-sort wait time is carried out on a per-session basis in accordance with results of the correlating with the database session identifier.

According to some embodiments, the performance-data presentation interface is operative such that the presented performance description describes the aggregate disk-sort wait time for the target database statement during the time interval.

According to some embodiments, the performance-data presentation interface is operative such that the presented performance description describes a ratio between: i) the aggregate disk-sort wait time for the target database statement during the time interval; and ii) a total wait time for the target database statement during the time interval.

It is now disclosed for the first time a system for displaying information related to performance of a database during a time interval where a given database statement is involved in multiple disk-sort operations, the system comprising: a) means for determining an estimated aggregate disk-sort wait time for the given database statement for the time interval when: i) the given database statement is involved in multiple disk-sort operations which contribute to the aggregate disk-sort wait time; and ii) the aggregate disk-sort wait time for the given database statement is only a fraction of a total disk-sort wait time for the database during for the time interval; and b) means for, in accordance with the estimated aggregate disk-sort wait time for the given database statement, presenting, to a user, a description of performance of the database during the time interval.

It is now disclosed for the first time a system for displaying information related to performance of a database during a time interval where a given database table or index is involved in multiple disk-sort operations, the system comprising: a) means for determining an estimated aggregate disk-sort wait time for the given database table or index for the time interval when: i) the given database table or index is involved in multiple disk-sort operations which contribute to the aggregate disk-sort wait time; and ii) the aggregate disk-sort wait time for the given database table or index is only a fraction of a total disk-sort wait time for the database during for the time interval; and b) means for, in accordance with the estimated aggregate disk-sort wait time for the given database table or index, presenting, to a user, a description of performance of the database during the time interval.

It is now disclosed for the first time a computer readable medium comprising program instructions, the computer readable medium for facilitating the display of information related to performance of a database during a time interval where a given database statement is involved in multiple disk-sort operations, wherein when executed the program instructions are operable to: a) determine an estimated aggregate disk-sort wait time for the given database statement for the time interval when: i) the given database statement is involved in multiple disk-sort operations which contribute to the aggregate disk-sort wait time; and ii) the aggregate disk-sort wait time for the given database statement is only a fraction of a total disk-sort wait time for the database during for the time interval; and b) in accordance with the estimated aggregate disk-sort wait time for the given database statement, present, to a user, a description of performance of the database during the time interval.

It is now disclosed for the first time a system for displaying information related to performance of a database during a time interval where a given database table or index is involved in multiple disk-sort operations, the system comprising: a) a performance-data handler operative to determine an estimated aggregate disk-sort wait time for the given database table or index for the time interval when: i) the given database table or index is involved in multiple disk-sort operations which contribute to the aggregate disk-sort wait time; and ii) the aggregate disk-sort wait time for the given database table or index is only a fraction of a total disk-sort wait time for the database during for the time interval; and b) performance-data presentation interface operative to present, to a user, a description of performance of the database during the time interval in accordance with the estimated aggregate disk-sort wait time for the given database table or index.

These and further embodiments will be apparent from the detailed description and examples that follow.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the invention is to cover all modifications, equivalents and alternatives falling within the spirit and scope of the present invention. As used throughout this application, the word may is used in a permissive sense (i.e., meaning having the potential to'), rather than the mandatory sense (i.e. meaning must).

DETAILED DESCRIPTION OF EMBODIMENTS

The present invention will now be described in terms of specific, example embodiments. It is to be understood that the invention is not limited to the example embodiments disclosed. It should also be understood that not every feature of the presently disclosed system, method and computer-readable code for display information related to database performance in accordance with aggregate disk-sort times is necessary to implement the invention as claimed in any particular one of the appended claims. Various elements and features of devices are described to fully enable the invention. It should also be understood that throughout this disclosure, where a process or method is shown or described, some of the steps of the method may be performed in any order or simultaneously, unless it is clear from the context that one step depends on another being performed first. The general principles described herein may be applied to other embodiments and applications without departing from the scope of the invention. Thus, the present invention is not to be limited to the embodiments shown, but is to be accorded the widest scope consistent with the principles and features described herein.

In one embodiment, a database performance-analysis tool (i.e., an apparatus, a computer-implemented method and/or computer code for monitoring a database) presents data descriptive of performance of a database (e.g. a relational database) in accordance with a total wait time of multiple disk-sorts carried out by a given database statement during period of time.

Towards this end, it may be necessary to (i) monitor the relational database over a time interval; (ii) determine when the given database statement (or a given external application which invokes the 'given database statement') is "waiting" for a disk-sort operation to complete; and (iii) quantify how long the given database statement waits for the disk-sort operation (i.e. determine or estimate an 'aggregate' wait time associated with multiple disk-sort operations per database statement over the time interval).

In different embodiments, the time interval may be at least a minute, at least an hour, at least 12 hours, at least a day, at least several days, at least a week, at least several weeks, etc.

This may be carried out for multiple database statements, where each database statement is correlated with a different respective "aggregate disk-sort" wait time for the time interval.

The presented performance data may be useful for assisting the database administrator when "tuning" the database to maintain and/or improve database performance.

The presently disclosed apparatus and method may be implemented using any combination of computer-executable code modules and hardware. In one embodiment, the presently disclosed apparatus is implemented using a single computer device or a plurality of computer devices in communication with each other.

Figure 1:
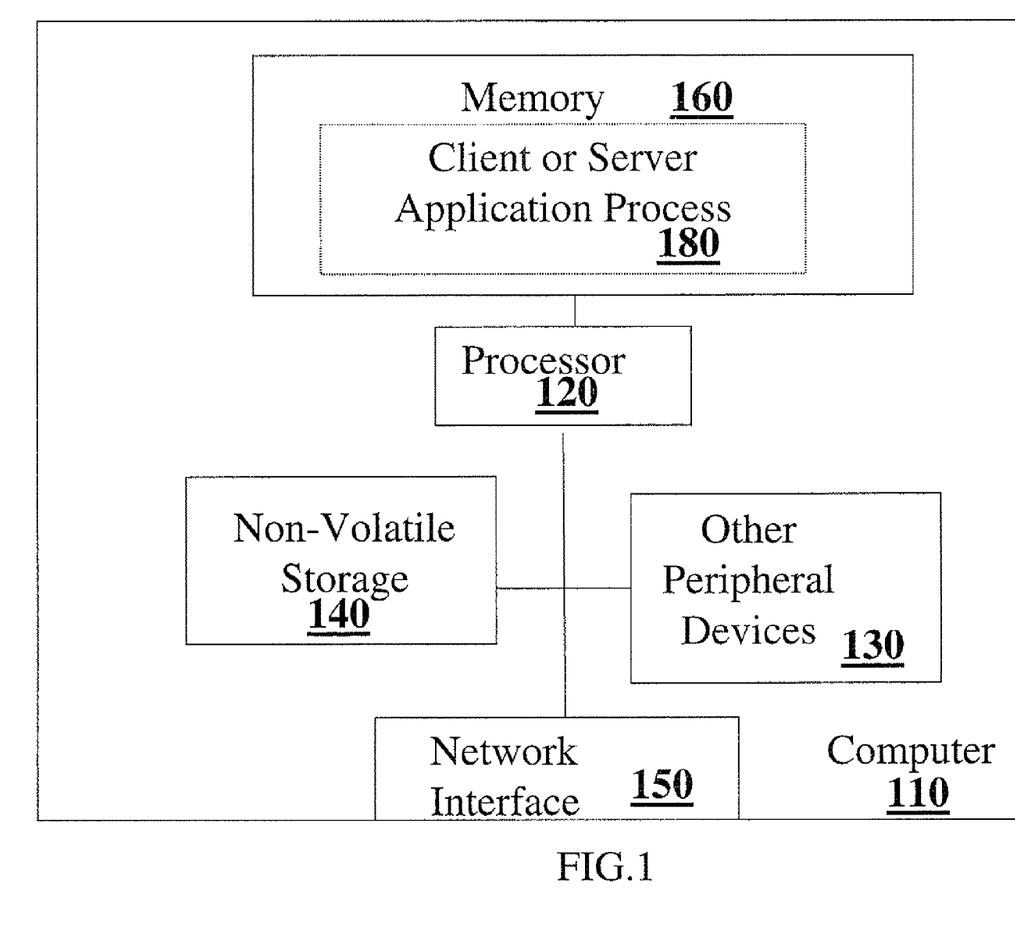
FIG. 1 is a block diagram of a computer in accordance with exemplary embodiments of the present invention.

A Discussion of FIG. 1

FIG. 1 illustrates one embodiment of a computer 110 including a processor 120. Processor 120 is shown coupled to a memory 160, a non-volatile storage 140, a video display device 135, a mouse 145, a keyboard 155, and a network interface 150 such as a network interface card. It is appreciated that not every element is required in every embodiment.

Processor 120 may be configured to execute instructions and to process data according to a particular instruction set architecture (ISA). In one embodiment, processor 120 may be configured to implement an x86 compatible ISA, although in other embodiments it is contemplated that any desired ISA may be employed, such as the SPARC V9 ISA, PowerPC compatible ISAs, or MIPS compatible ISAs, for example. (SPARC is a registered trademark of Sun Microsystems, Inc.; PowerPC is a registered trademark of International Business Machines Corporation; MIPS is a registered trademark of MIPS Computer Systems, Inc.).

In various embodiments, memory 160 may comprise any suitable type of system memory as described above, such as FB-DIMM, DDR/DDR2 SDRAM, or RDRAM3, for example. Memory 160 may include multiple discrete banks of memory. Also, in some embodiments memory 160 may include multiple different types of memory.

In some embodiments, computer 110 may include more than one instance of the devices shown, such as more than one processor 120, for example. In various embodiments, computer 110 may be configured as a rack-mountable server system, a standalone system, or in any other suitable form factor. In different embodiments, computer 110 may be configured as a client system or as a server system.

Figure 3:
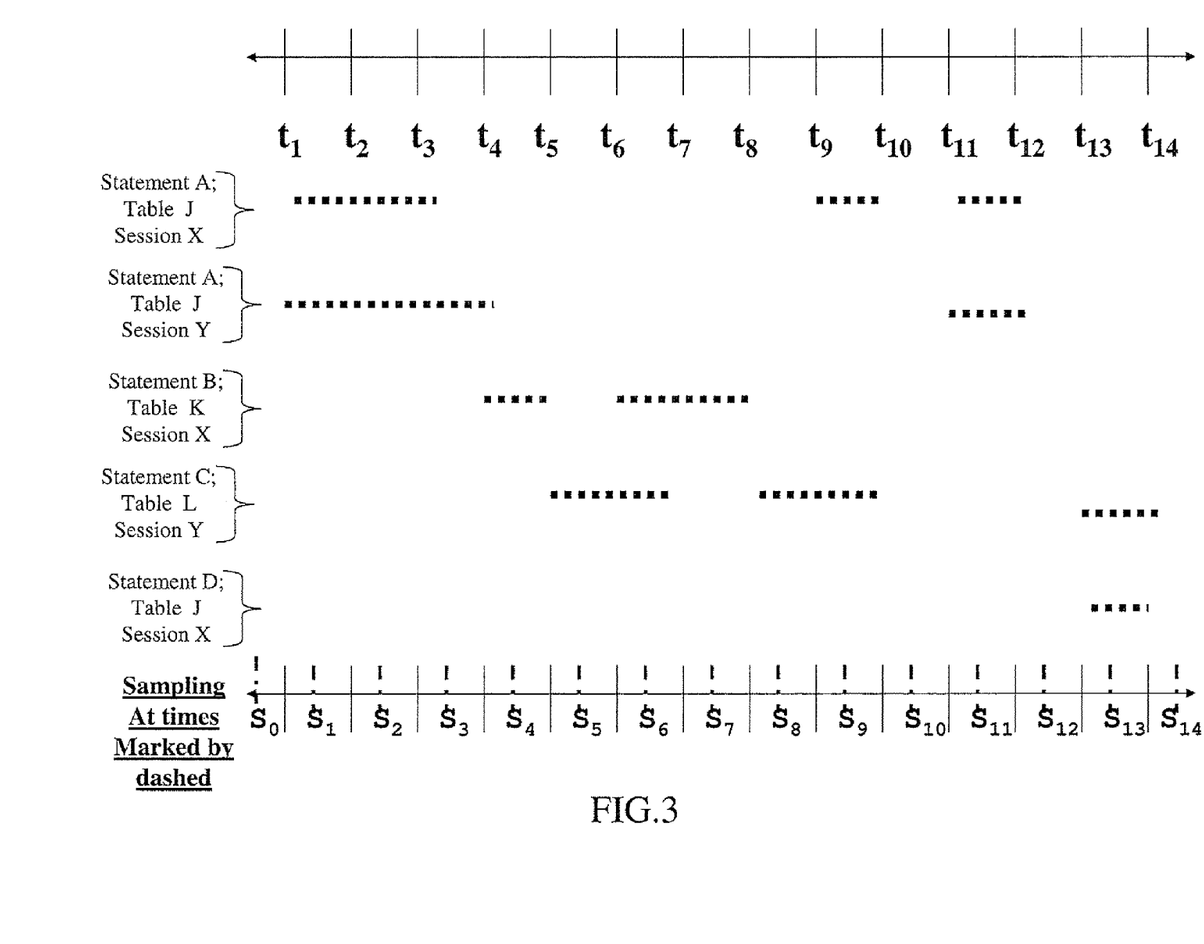
FIG. 3 describes an example where multiple disk-sort operations are carried out by a database.

In one embodiment, processor 120 may be configured to run operating system software such as Microsoft Windows, IBM AIX or Sun Microsystems Solaris. Operating system software may in turn provide an environment in which processor 120 may execute additional software modules in the form of applications, programs, or processes designed to perform specific functions. Running operating system software or software modules may comprise executing instructions that are stored in memory 160. As shown in FIG. 3, a client or server application process resides in the memory 160.

Software modules that may be executed by processor 120 may include, in one embodiment, client/server software such as a web server or a web browser. Alternatively, or in addition, processor 120 may execute software modules comprising network management software, office productivity tools, e-mail programs, etc. Many other types of software may be executed such as a virtual machine runtime environment, a database, an application server, and diagnostic, monitoring, profiling, or analysis software. Furthermore, while executing such software, processor 120 may retrieve data from and store data in non-volatile storage 140 or in memory 160.

As shown in FIG. 1, a client or server application process 180 to be performance-monitored resides in memory 160. In one embodiment, one or more software processes may perform the function of profiling other software processes (e.g. process 180) during operation, gathering and storing data indicative of the operation of one or more of the other software processes. The performance-monitored software application may reside on computer 110. Alternatively or additionally, the performance-monitored software application may reside on a different computer. These monitored application (i.e. database management system) may reside on a single computer 110 or may be a distributed or clustered application residing on a plurality of computers 110.

DEFINITIONS

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

For the present disclosure, a "disk-sort" operation is an operation carried out by the database (for example, a relational database) in the course of execution of a database statement—i.e. sorting of data retrieved from a database table or index (i.e. temporary or otherwise) during execution of a database statement—where the retrieved data is sorted on disk rather than in volatile memory. For some databases, one or more temporary files may be created by the database, and the data retrieved from a table or index (i.e. temporary or 'permanent') may be stored in the temporary file and sorted "within the temporary file." It is noted that there are some situations where multiple distinct "disk-sort" operations may be required when executing a single database statement. In some particular situations, each of the multiple "disk-sort" operations may be carried out for a different purpose—for example, one disk-sort operation may be needed for a "join," a second disk-sort operation may be needed to handle a sub-query required by the database statement, and a third disk-sort operation may be needed to handle an 'order by' directive.

When a database statement that is "involved" in a "disk-sort" operation, execution of the database statement causes (i.e. as an 'intermediate step' during execution of the database statement) a "disk-sort" operation—i.e. during execution of the database statement, retrieved data (i.e. retrieved from a table or index) is sorted "on disk."

During a time interval, a "given" database statement may be executed multiple times, and may be "involved" with multiple distinct "disk-sort" operations. The aggregate "disk-sort" wait time is the total wait time (i.e. the total amount of time that the given database statement must wait for a 'disk-sort' operation to complete during execution), summed over all of the "disk-sort" operations. In some embodiments, rather than computing the aggregate wait time "exactly," some estimate of the wait time may be made, to obtain the "estimated" aggregate disk-sort wait time.

It is appreciated that in many commercial database systems, multiple different database statements will be "involved" with "disk-sort" operations. Thus, in a given time interval, the total aggregate disk-sort wait time for a given single database statement selected from the multiple database statements may only be a fraction (i.e. less than 1 and greater than 0—for example, less than 50% or less than 10% or less than 1% or less than 0.1%) of the total aggregate disk-sort wait time for the database.

During database execution, one or more external "client" applications may send a request to the database to execute one or more database statements. Towards this end, the client may establish a "session" or a "connection" (for example, a JDBC or ODBC connection) to the database. At any given time, the database may be simultaneously handling requests from multiple "applications" or "sessions" or "connections," where each "application" or "session" or "connection" is associated with a different respective "session identifier" which identifies the "session" or "application" or "connection" with the database from an external program or code module that is "external" to the database.

Figure 2:
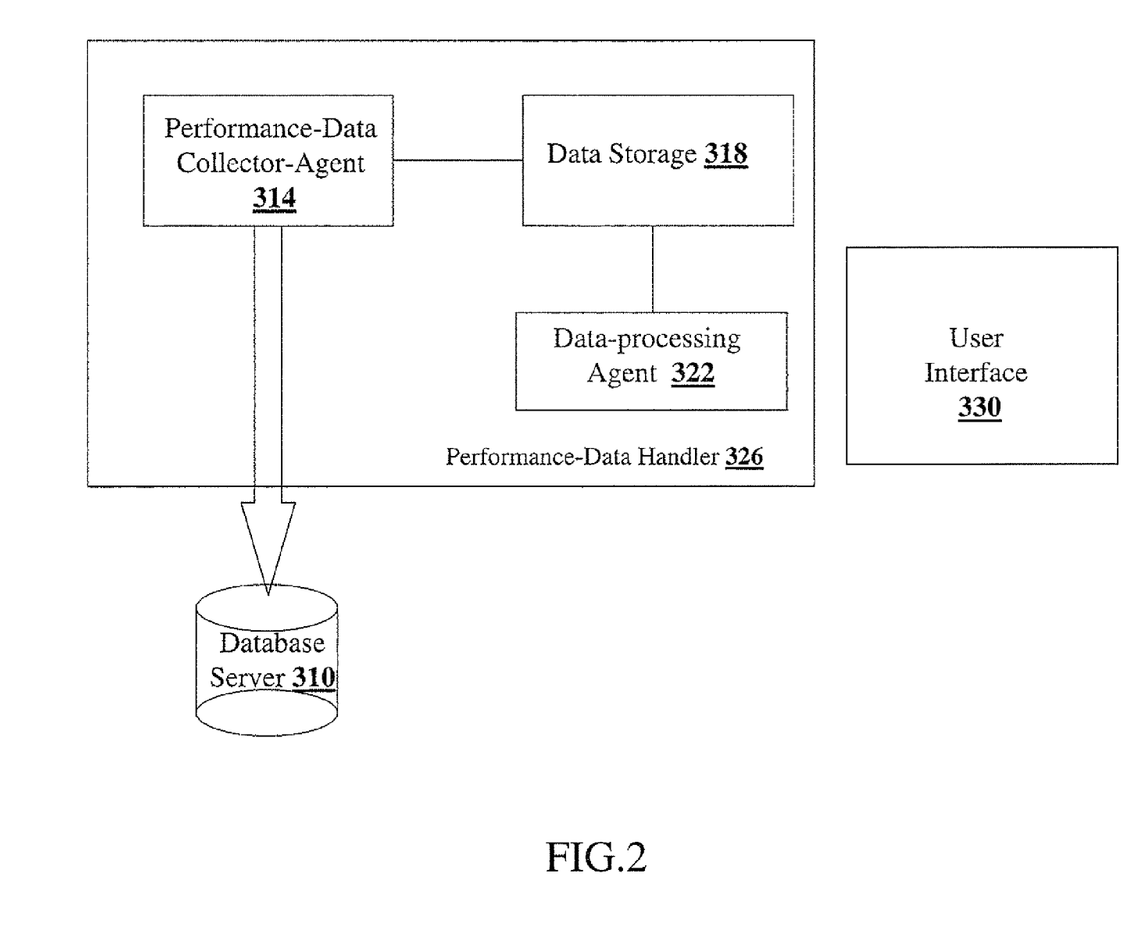
FIG. 2 is a block diagram of a system for performance-monitoring a database in accordance with some embodiments.

Discussion of FIG. 2

FIG. 2 provides a block diagram of an exemplary architecture for (a) collecting performance data for an executing configurable database 310 including data describing whether or not a "disk-sort" operation is occurring at a given 'sample' time and/or an identity of a database statement which is "involved" with the disk-sort operation; (b) storing the collected performance data in a data storage 318; (c) analyzing or processing the data, using data-processing agent 322 which may 'process' stored information about database performance.

In one example, data-processing agent may determine from information about when given "disk-sort" operations take place an "aggregate" disk-sort wait time for a given database item such as a database statement or a database table or a database index.

It is appreciated the data storage 318 may store data other than the performance data. The data of the data storage 318 may be accessible by any number of executing processes on a single computer 110 or from multiple computers. Furthermore, data storage 318 may be implemented in any combination of volatile memory 160 (including but not limited to RAM) and non-volatile storage 140 (including but not limited to magnetic storage and flash storage).

Exemplary routines for data collection, data analysis, and issuing the alert are discussed below with reference to FIGS. 3A-3C.

As with any embodiment of the present invention, the system of FIG. 2 as a whole as well as each individual component may all reside on a single computer 110 or may be 'distributed' among more than one computer 110 in communication via a local or wide-area computer network.

Database server 310 or database management system is typically a relational database, including but not limited to Oracle®, SQLServer®, Sybase®, IBM DB2®, and MySQL®.

As used herein, an 'agent' (for example, collector agent 314 or data storage agent 326) refers to computer code (i.e. stored on a computer-readable medium) operative to carry out one or more tasks. The computer code may be implemented in any single computer language or combination of computer languages, including but not limited to machine-readable code (for example, machine language or assembler), so-called intermediate code (for example, Java byte code or .NET), compiled code (for example, compiled C++ code), and human readable code (for example, query language code such as SQL; for example, scripting code). The agent may be deployed in any number of process spaces, and on any number of computers 110 (for example, residing on a single computer 110, or the agent may be 'distributed' among a plurality of machines).

A 'collector agent' is operative to collect performance data an on ongoing basis—i.e. by collecting a sample of performance data at different times (i.e. repeatedly collecting different samples of performance data). In one non-limiting example, the collector agent includes one or more computer-executable code modules stored on a storage medium.

A "database-processing agent" is operative to process or analyze performance data. In one non-limiting example, the data-processing agent includes one or more computer-executable code modules stored on a storage medium.

In the example of FIG. 2, the system provides a user interface 330 (for example, a graphic user interface (GUI)) for presenting (i.e. displaying, for example, on a computer screen) performance data in accordance with at least one of (i) an aggregate disk-sort wait time for a "given" database statement; (ii) an aggregate disk-sort wait time for a "given" database table; (iii) an aggregate disk-sort wait time for a "given" database index.

Performance-data collector agent 314, data storage 318, and data-processing agent 322 are collectively referred to as a performance-data handler 326.

Discussion of FIG. 3

Before describing various flowcharts of routines for estimating aggregate wait times of disk-sort operations, an exemplary non-limiting use case is described.

In this simplified use case (i) three database statements (i.e. statements A, B, C and D) are executed; (ii) the database is handling two database "sessions" (which also may be referred to as 'connections' or 'applications'); (iii) statements A and D retrieve database from Table J (the retrieved data is sorted on disk); (iv) statement B retrieves data from Table K (the retrieved data is sorted on disk); and (v) statement C retrieves data from Table L (the retrieved data is sorted on disk).

The "time interval" is between time $t_1$ and time $t_{14}$.

During the time interval, statement A is "involved" in five "disk-sort" operation: (i) a first operation, in session X, that begins at time $t_1$ and ends at time $t_3$; (ii) a second operation, in session Y, that begins at time $t_1$ and ends at time $t_4$; (iii) a third operation, in session X, that begins at time $t_9$ and ends at time $t_{10}$; (iv) a fourth operation, in session X, that begins at time $t_{11}$ and ends at time $t_{12}$; and (v) a fifth operation, in session Y, that begins at time $t_{11}$ and ends at time $t_{12}$;

The aggregate "disk-sort" wait time for statement A is:

Aggregate_statement_$A=(t_3-t_1)+(t_4-t_1)+2*(t_{10}-t_9)+(t_{12}-t_{11})$.

It is also possible to determine the aggregate "disk-sort" for a subs-set of all "disk-sort" operations that statement A is involved in. Thus, a first sub-set set is defined as all "disk-sort" operations for statement A within session X—for this first sub-set the aggregate "disk-sort" wait time is $(t_3-t_1)++(t_{10}-t_9)+(t_{12}-t_{11})$. A second sub-set set is defined as all "disk-sort" operations for statement A within session X—for this second sub-set the aggregate "disk-sort" wait time is $(t_4-t_1)+(t_{10}-t_9)$.

Similarly, for statement B the aggregate "disk-sort" is:

Aggregate_statement_$B=(t_5-t_4)+(t_8-t_6)$.

(in contrast to statement A which is 'heterogeneous in session' because executions from two different sessions may contribute to the total aggregate "disk-sort," for statement B, which is only executed from session Y during the illustrated time interval, it may be said that the wait time is 'homogenous in session).

The aggregate "disk-sort" wait time for statement C is:

Aggregate_statement_$C=(t_7-t_5)+(t_{10}-t_8)$.

The aggregate "disk-sort" wait time for session X is:

Aggregate_session_$X=(t_3-t_1)+(t_5-t_4)+(t_8-t_6)+(t_{14}-t_{13})$.

The aggregate "disk-sort" wait time for session Y is:

Aggregate_session_$Y=(t_7-t_5)+(t_{10}-t_8)+(t_{14}-t_{13})$.

The aggregate "disk-sort" wait time for table J is:

Aggregate_table_$J=(t_3-t_1)+(t_4-t_1)+2*(t_{10}-t_9)+(t_{12}-t_{11})+(t_{14}-t_{13})$.

(note that this is 'heterogeneous in statement' because two different database statement contribute to the aggregate "disk-sort" wait time—statement A and statement D; also note that the total "disk-sort" wait time for table J is also 'heterogeneous in session').

Embodiments of the present invention provide methods, apparatus and computer-readable medium for tracking the type of activity (i.e. by a database) illustrated in FIG. 3 and for determining estimated values of aggregate disk-sort" wait times for at least one of: (i) a given database statement; (ii) a given database table; (iii) a given database index; and/or (iv) a given database session. Once data describing these wait times is obtained, it is possible to present, in accordance with one or more of the aggregate wait times (i.e. that is correlated with one of the database items such as a statement, table, index or session) a description of database performance to a user.

It is noted that FIG. 3 is directed to the "disk-sort" wait times for various database statements—the entire or total wait for each database statement execution may be longer—i.e. since the "disk-sort" wait time is just a fraction of the total wait time.

Figure 4:
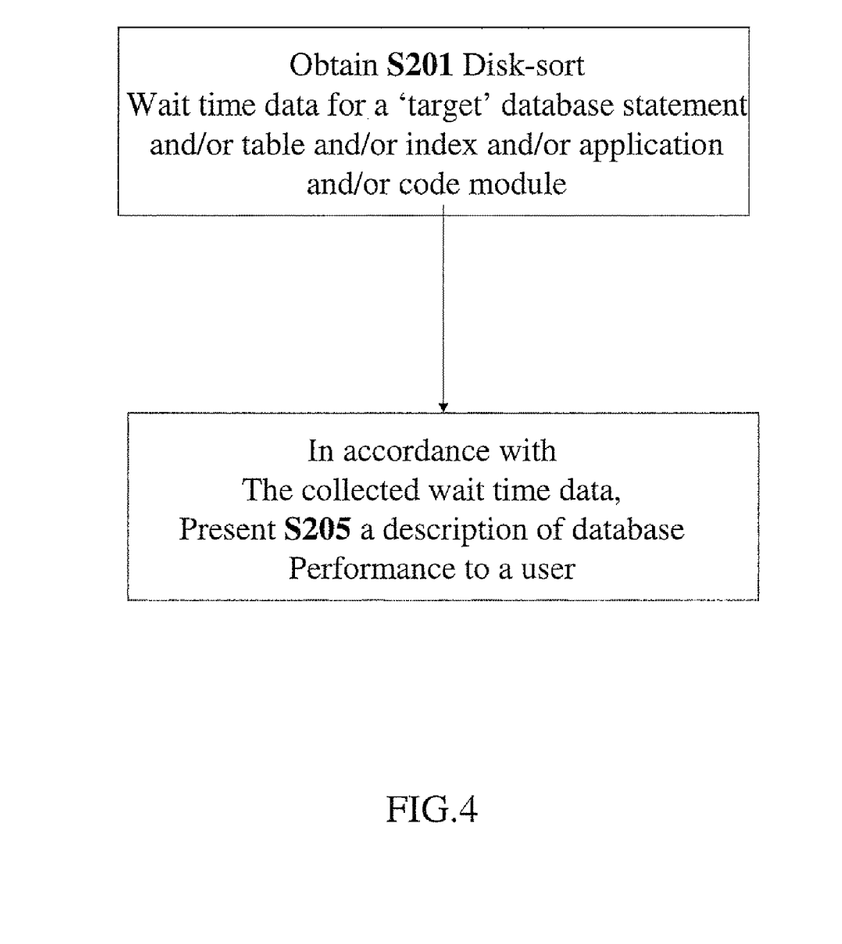
FIG. 4, 6A-6B are flow charts of routines for performance-monitoring a database in accordance with some embodiments.
Figure 5:
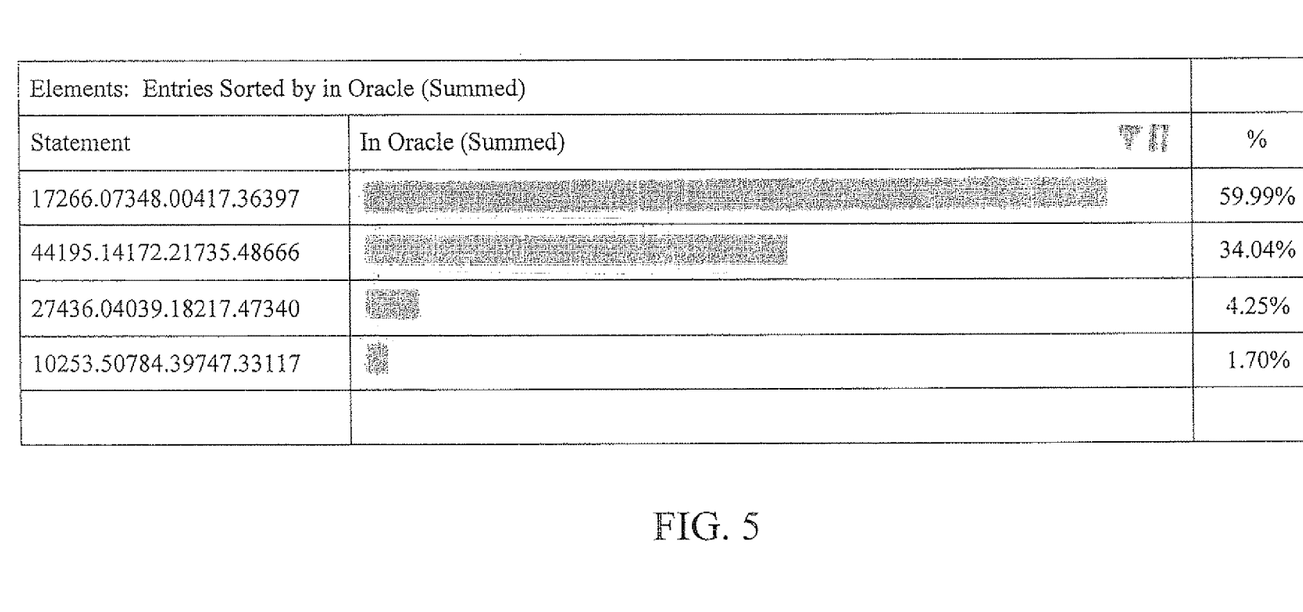
FIG. 5 is a screen shot of an exemplary interface for presenting database performance-data in accordance with aggregate sort-on-disk times in accordance with some embodiments.

Discussion of FIGS. 4-5

FIG. 4 presents a flow chart describing an exemplary routine for presenting a description of database performance data in accordance with some embodiments of the present invention.

In step S201, wait time data (for example, wait relating to aggregate wait times of "disk-sort" operations during a time interval) is collected S201 for at least one database item selected from the group consisting of (i) a given database statement; (ii) a given database table; (iii) a given database index; and (iv) a given database session.

In step S205. a description of database performance (i.e. one or more aspects of database performance) is presented to a user in accordance with the "disk-sort" wait time data obtained in step S201.

In some embodiments, the description of database performance includes a description of an aggregate wait time (i.e. either an absolute total or a "relative wait time" describing the relative contribution of "disk-sort" wait time to an overall wait time) for the particular database statement and/or table and/or index and/or session.

Reference is now made to FIG. 5. In FIG. 5, for each database statement of a plurality of database statements, the following is presented: (i) a respective database string identifying the database statement; and (ii) a respective indication (either graphical or as a number) of the respective relative contribution of "disk-sort" wait time to the total wait time. Thus, for database statement 1722.07348.00417.36397, 59.99% of the total wait time for execution of statement 1722.07348.00417.36397 is attributable to "disk-sort" wait time.

Furthermore, it is noted that the list of four database statements in FIG. 5 is sorted in accordance with the "disk-sort" wait times—i.e. the database statement where "disk-sort" wait time has the greatest contribution is presented first.

In some embodiments, user interface 330 is operative to "filter out" database statements where the "disk-sort" wait time is below some sort of absolute threshold, or relative threshold (i.e. relative to other "competing" database statements with greater "disk-sort" wait time or where "disk-sort" wait time has a greater fractional contribution to total wait time).

Although FIG. 5 relates to database statements (i.e. presenting "disk-sort" wait time on a "per database statement basis), it is appreciated that similar data may be presented on a "per table basis" or "per table index basis" or on a "per session basis."

Figure 6A:
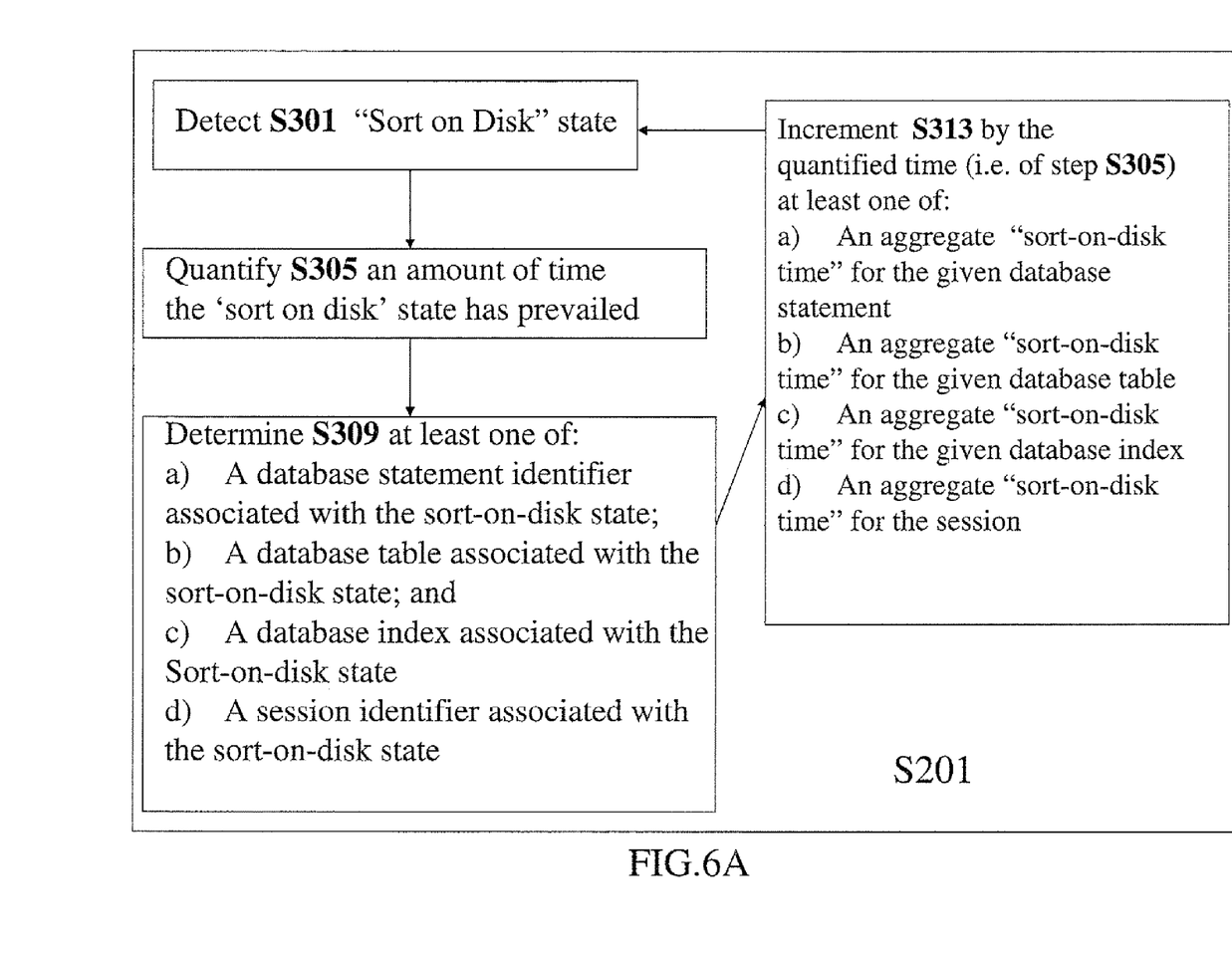
Figure 6B:
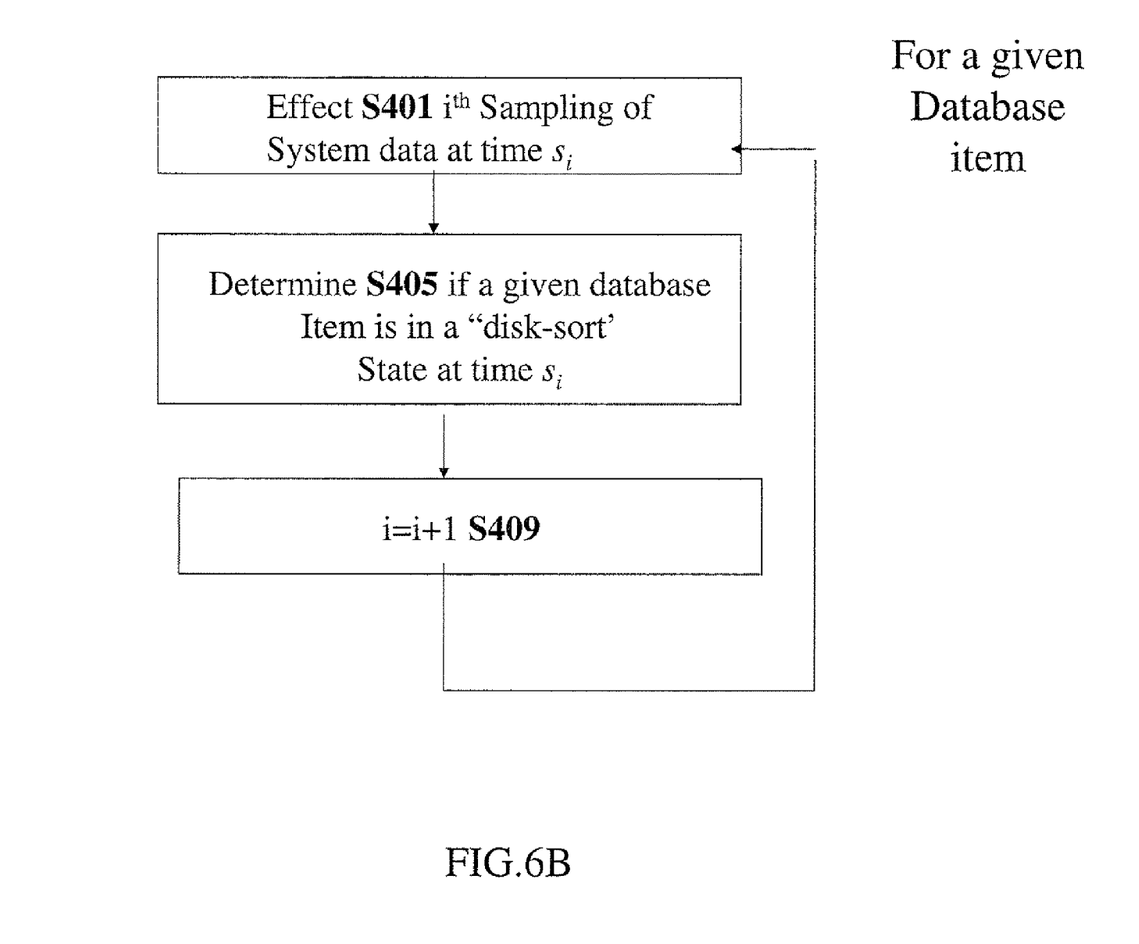

Discussion of FIGS. 6A-6B

FIGS. 6A-6B provide flow charts of exemplary techniques for implementing step S201 and for determining an estimated aggregate "disk-sort" wait time for a given time interval for a given monitored database statement and/or table and/or index and/or session in accordance with some embodiments of the present invention.

In step S301, it is detected whether or not a given database statement and/or a given database table and/or a given database index and/or a given database session is in a 'disk-sort' state at a given time—i.e. whether or not the executing database statement (or a table or index accessed by the database statement) or session is 'waiting for' a disk-sort operation to complete.

In one example, this may be done by accessing system memory or one or more 'system tables' of the relational database describing which operations are executing.

In one specific example, it is possible to determine an identifier of an executing database statement within a database session, and an identifier of a "file" for which the database statement is "waiting." In the event that the "file" for which the database statement is "waiting" is a temporary file (e.g. a file associated with a temporary table), then, in some embodiment, it may be assumed that because the database item (i.e. statement, index, table, etc) is waiting for a temporary file, in all likelihood the database statement is waiting for a disk-sort operation that is being carried out on the temporary file.

In the event of a positive detecting (i.e. that it is determined a disk-sort" operation is being carried out for the database item), an amount of time (e.g. an estimated amount of time) that the database statement or table or index or session has been in the "disk-sort" state (i.e. a state where the disk-sort operation is being carried out) is quantified.

In step S309, at least one of a database statement identifier (i.e. an identifier or the statement that was in the "disk-sort" state) or a table identifier (i.e. a table or index that was accessed and where which retrieved data sorted on disk) or an index identifier (i.e. an index used to retrieve results that are sorted on the disk or an index from which data is retrieved—for example, a clustered index) or a session identifier is determined.

In step S313, at least one aggregate "disk-sort" wait time (e.g. an aggregate database statement "disk-sort" wait time (i.e. either for all sessions or a particular session or set of sessions) (i.e. either for a database statement or for a defined set of statements) or an aggregate database table or index or session wait time) is incremented by the quantified time of step S305.

Reference is now made to FIG. 6B, which is a flow chart for a technique for tracking "disk-sort" states and associated wait times in accordance with some embodiments.

In step S401, system data or the database is read (for example, by sampling system memory or by reading or one or more system data structures of the database) for example, repeatedly over a period of time (for example, every second or every ½ second or every two seconds, etc etc). There is no requirement that the rate at which the system data is read remain constant (however, this is indeed possible). In one example, the system data is read a given time, then again 2 seconds later, then again 1 second later, then again 2 seconds later, etc etc.

One example of multiple 'system data sample times' is illustrated at the bottom of FIG. 3, where system data may be read first at time $S_1$, and then at time $S_2$, and then at time $S_3$, etc.

For each sampling (see step S405), it is determined which database items (for example, statements or table or indexes) and are in the "disk-sort" state.

In addition, it may be possible (see, for example, step S305 of FIG. 6A) to quantify an amount of wait time associated with the "disk-sort" state in accordance with a "time gap" between a 'current' sampling time of step S401 $S_i$ and a previous (i.e. the immediate predecessor) sampling time $S_{i-1}$ of step S401 (i.e. a previous execution).

Thus, referring to FIG. 3, to "statement A, Table J session X" it is possible to determine an estimated value of an aggregate "disk-sort" wait time (i.e. whose exact value was given above as $(t_3-t_1)+(t_{10}-t_9)+(t_{12}-t_{11})$) as follows:

(i) we start with an aggregate "disk-sort" time of 0 for "statement A, Table J session X" state;

(ii) at sampling time $S_0$, we see that "statement A, Table J session X" is not in the "disk-sort" state;

(iii) at sampling time $S_1$, we see that "statement A, Table J session X" is in the "disk-sort" state—thus we increment the aggregate time by $S_1-S_0$;

(iv) at sampling time $S_2$, we see that "statement A, Table J session X" is in the "disk-sort" state—thus we increment the aggregate time by $S_2-S_1$;

(v) at sampling time $S_3$, we see that "statement A, Table J session X" is not in the "disk-sort" state;

(vi) at sampling time $S_4$, we see that "statement A, Table J session X" is not in the "disk-sort" state;

(vii) at sampling time $S_5$ we see that "statement A, Table J session X" is not in the "disk-sort" state;

(viii) at sampling time $S_6$, we see that "statement A, Table J session X" is not in the "disk-sort" state;

(ix) at sampling time $S_7$, we see that "statement A, Table J session X" is not in the "disk-sort" state;

(x) at sampling time $S_8$, we see that "statement A, Table J session X" is not in the "disk-sort" state;

(xi) at sampling time $S_9$, we see that "statement A, Table J session X" is in the "disk-sort" state—thus we increment the aggregate time by $S_9-S_8$;

(xii) at sampling time $S_{10}$, we see that "statement A, Table J session X" is not in the "disk-sort";

(xiii) at sampling time $S_{11}$, we see that "statement A, Table J session X" is in the "disk-sort" state—thus we increment the aggregate time by $S_{11}-S_{10}$;

(xiv) at sampling times $S_{12}-S_{14}$, we see that "statement A, Table J session X" is not in the "disk-sort";

According to this technique, we estimate the aggregate disk-sort" wait time of $(t_3-t_1)+(t_{10}-t_9)+(t_{12}-t_{11})$ by $S_2-S_0+S_9-S_8+S_{11}-S_{10}$.

It is appreciated that taking more frequent "measurements" of what is happening in the database may provide a more accurate estimate of wait times, though at the possible cost of greater computational resources being expended.

In step S409, some sort of counter labeling the sampling as the $i^{th}$ sampling may be incremented.

Additional Discussion

In some embodiments, the 'average wait time' per disk-sort" operation may be determined (i.e. and data presented in accordance with this per operation value). Thus, in the example of FIG. 3, for "statement A, Table J session X," the 'average wait time' per disk-sort operation' may be written as $[(t_3-t_1)+(t_{10}-t_9)+(t_{12}-t_{11})]/3$. In some embodiments, data may be presented in accordance with this 'average wait time' per disk-sort operation' value for a statement (i.e. either for all sessions or a single session or group of sessions) or table or index or session.

In some embodiments, this value may be presented in step S205 of FIG. 4.

In some embodiments, one or more tuning recommendations may be presented in step S205 of FIG. 4.

It is further noted that any of the embodiments described above may further include receiving, sending or storing instructions and/or data that implement the operations described above in conjunction with the figures upon a computer readable medium. Generally speaking, a computer readable medium may include storage media or memory media such as magnetic or flash or optical media, e.g. disk or CD-ROM, volatile or non-volatile media such as RAM, ROM, etc. as well as transmission media or signals such as electrical, electromagnetic or digital signals conveyed via a communication medium such as network and/or wireless links.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb. All references cited herein are incorporated by reference in their entirety. Citation of a reference does not constitute an admission that the reference is prior art.

The articles "a" and "an" are used herein to refer to one or to more than one (i.e., to at least one) of the grammatical object of the article. By way of example, "an element" means one element or more than one element.

The term "including" is used herein to mean, and is used interchangeably with, the phrase "including but not limited" to.

The term "or" is used herein to mean, and is used interchangeably with, the term "and/or," unless context clearly indicates otherwise. The term "such as" is used herein to mean, and is used interchangeably with, the phrase "such as but not limited to".

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

What is claimed is:

1. A method for displaying information related to performance of a database during a time interval where a given database statement is involved in multiple disk-sort operations, the method comprising:
    a) determining an estimated aggregate disk-sort wait time for the given database statement for the time interval when:
        i) the given database statement is involved in multiple distinct disk-sort operations which contribute to the aggregate disk-sort wait time; and
        ii) the aggregate disk-sort wait time for the given database statement is only a fraction of a total disk-sort wait time for the database during the time interval; and
    b) in accordance with the estimated aggregate disk-sort wait time for the given database statement, presenting, to a user, a description of performance of the database during the time interval.

2. The method of claim 1 wherein the estimated aggregate disk-sort wait time for the given database statement is an aggregated wait time for a proper sub-set of all database disk-sort operations carried out by execution of the given database statement during the time interval.

3. The method of claim 2 wherein:
    i) the given database statement is invoked in a plurality of distinct associated database sessions during the time interval; and
    ii) the proper sub-set is determined in accordance with database session identifier.

4. The method of claim 1 wherein the determining of the estimated aggregate disk-sort wait time for the given database statement for the time period includes:
    i) for each distinct sample time of a plurality of sample times during the time interval:
        A) respectively detecting a disk-sort operation;
        B) effecting a respective one or more correlation operations to correlate respective results of the detecting with an identifier of the given database statement; and
    ii) determining the aggregate disk-sort wait time for the given database statement in accordance with results of the correlation operations for the plurality of sample times.

5. The method of claim 4 wherein:
    i) the respective effecting of one or more correlation operations further includes correlating the respective results of the detecting with an identifier or an invoking database session which invoked the given database statement; and
    ii) the determining of the aggregate disk-sort wait time is carried out on a per-session basis in accordance with results of the correlating with the database session identifier.

6. The method of claim 1 wherein the presented performance description describes the aggregate disk-sort wait time for the given database statement during the time interval.

7. The method of claim 1 wherein the presented performance description describes a ratio between:
    i) the aggregate disk-sort wait time for the given database statement during the time interval; and
    ii) a total wait time for the given database statement during the time interval.

8. The method of claim 1 wherein:
    i) step (a) is carried out for a plurality of distinct database statements; and
    ii) the database performance description presenting include displaying a list of at least some of the database statements of the plurality of database statements in accordance with the respective estimated aggregate disk-sort wait times for each database statement of the plurality of database statements.

9. The method of claim 8 wherein the displayed list of database statements is sorted in accordance with relative values of the estimated aggregate disk-sort wait times.

10. The method of claim 8 wherein the database statement list displaying includes:
    i) selecting a sub-plurality of database statements from the plurality of distinct database statements in accordance with the relative estimated aggregate disk-sort wait times;
    ii) presenting only the selected sub-plurality of database statements.

11. The method of claim 1 wherein the performance-data presenting includes presenting a description of a relation between the estimated aggregate disk-sort wait time for the given database statement and at least one of:
    i) an aggregate lock wait-time during the time interval for the given database statement;
    ii) a total CPU wait time during the time interval for the given database statement;
    iii) a total communication wait time during the time interval for the given database statement; and
    iv) a total I/O wait time during the time interval for the given database statement.

12. A method for displaying information related to performance of a database during a time interval where a given database index or table is involved in multiple disk-sort operations, the method comprising:

a) determining an estimated aggregate disk-sort wait time for the given database index or table for the time interval when:
  i) the given database table or index is involved in multiple disk-sort operations which contribute to the aggregate disk-sort time; and
  ii) the aggregate disk-sort wait time for the given database table or index is only a fraction of a total disk-sort wait time for the database during for the time interval; and
b) in accordance with the estimated aggregate disk-sort wait time for the given database table or index, presenting, to a user, data describing performance of the database during the time interval.

13. The method of claim 12 wherein the determining of the estimated aggregate disk-sort wait time for the given database statement for the time period includes:
  i) for each distinct sample time of a plurality of sample times during the time interval:
    A) respectively detecting a disk-sort operation;
    B) determining an identifier of a database statement involved in the disk-sort operation;
    C) correlating the disk-sort operation with the involved database and with a table or index accessed by the database statement;
  ii) determining the aggregate disk-sort wait time for the given database table or index in accordance with results of the correlation operations for the plurality of sample times.

14. A system for displaying information related to performance of a database during a time interval where a given database statement is involved in multiple disk-sort operations, the system comprising:
  a) a processor operative to determine an estimated aggregate disk-sort wait time for the given database statement for the time interval when:
    i) the given database statement is involved in multiple disk-sort operations which contribute to the aggregate disk-sort wait time; and
    ii) the aggregate disk-sort wait time for the given database statement is only a fraction of a total disk-sort wait time for the database during for the time interval; and
  b) a computer screen, in conjunction with the processor, operative to present, to a user, a description of performance of the database during the time interval in accordance with the estimated aggregate disk-sort wait time for the given database statement.

15. The system of claim 14 wherein the processor is operative such that the estimated aggregate disk-sort wait time for the given database statement is an aggregated wait time for a proper sub-set of all database disk-sort operations carried out by execution of the given database statement during the time interval.

16. The system of claim 15 wherein:
  i) the given database statement is invoked in a plurality of distinct associated sessions during the time interval; and
  ii) the processor is operative such that the proper sub-set is determined in accordance with session identifier.

17. The system of claim 14 wherein the processor is operative such that the determining of the estimated aggregate disk-sort wait time for the given database statement for the time period includes:
  i) for each distinct sample time of a plurality of sample times during the time interval:
    A) respectively detecting a disk-sort operation;
    B) effecting a respective one or more correlation operations to correlate respective results of the detecting with an identifier of the given database statement; and
  ii) determining the aggregate disk-sort wait time for the given database statement in accordance with results of the correlation operations for the plurality of sample times.

18. The system of claim 17 wherein:
  i) the respective effecting of one or more correlation operations further includes correlating the respective results of the detecting with an identifier or an invoking database session which invoked the given database statement; and
  ii) the determining of the aggregate disk-sort wait time is carried out on a per-session basis in accordance with results of the correlating with the database session identifier.

19. The system of claim 14 wherein the processor is operative such that the presented performance description describes the aggregate disk-sort wait time for the given database statement during the time interval.

20. The system of claim 14 wherein the processor is operative such that the presented performance description describes a ratio between:
  i) the aggregate disk-sort wait time for the given database statement during the time interval; and
  ii) a total wait time for the given database statement during the time interval.

* * * * *